United States Patent [19]
Hahn et al.

[11] Patent Number: 4,748,733
[45] Date of Patent: Jun. 7, 1988

[54] REMOVAL OF OLD SPLIT-PIN ASSEMBLIES FROM GUIDE TUBES AND REPLACEMENT BY NEW SPLIT-PIN ASSEMBLIES

[75] Inventors: Joseph J. Hahn, Brentwood; David A. Howell, Plum Borough, both of Pa.

[73] Assignee: Westinghouse Electric Corp., Pittsburgh, Pa.

[21] Appl. No.: 902,282

[22] Filed: Aug. 29, 1986

[51] Int. Cl.$^4$ .............................................. G21C 19/00
[52] U.S. Cl. ................... 29/402.08; 29/426.4; 29/400 N; 81/13; 225/102; 376/260
[58] Field of Search ............ 376/260, 261; 29/400 N, 29/723, 402.03, 402.08, 426.4, 426.5; 81/13, 55; 225/102

[56] References Cited

U.S. PATENT DOCUMENTS

| | | | |
|---|---|---|---|
| 2,600,214 | 6/1952 | Davis | 81/13 |
| 3,000,097 | 9/1961 | Hartz | 29/426.4 |
| 3,731,559 | 5/1973 | Krupke | 81/13 |
| 3,887,980 | 6/1975 | Yates et al. | 29/723 |
| 4,191,235 | 3/1980 | Davis | 81/13 |
| 4,194,286 | 3/1980 | Kearns | 225/102 |
| 4,416,848 | 11/1983 | Feutrel | 376/260 |
| 4,585,613 | 4/1986 | Styskal et al. | 376/260 |
| 4,590,671 | 5/1986 | Havoic-Conroy | 376/260 |
| 4,624,042 | 11/1986 | Green | 376/271 |

FOREIGN PATENT DOCUMENTS 2077989 12/1981 United Kingdom ................ 376/260

OTHER PUBLICATIONS

German DT 3,327,726, 2/84, Abstract.

Primary Examiner—Deborah L. Kyle
Assistant Examiner—Daniel Wasil

[57] ABSTRACT

The guide tube is mounted on a fixture with the split-pins of each old split-pin assembly straddling a knife edge. The nut of each old split-pin assembly is engaged by a socket of a wrench and a high torque is impressed on the nut. The torque is of sufficient magnitude to shear the weld by which the nut is joined to the split-pin and/or to shear the pin particularly at the edge of a keyway where a button to which the weld is joined is engaged. The knife edge which each split-pin straddles prevents the pin from turning under the torque applied to the nut. After the weld or the pin is sheared the nut or the nut and the pin fragment joined to it is unthreaded from the pin or pin fragment and the separated parts are disposed of. Typically the nut of an old split-pin assembly has diametrically cut slots in its wall. The socket of the wrench is provided with projections which engage the nut in the slots. The torque is applied to the nut through these projections.

12 Claims, 8 Drawing Sheets

REMOVAL OF OLD SPLIT-PIN ASSEMBLIES FROM GUIDE TUBES AND REPLACEMENT BY NEW SPLIT-PIN ASSEMBLIES

REFERENCE TO RELATED APPLICATIONS

Application Ser. No. 891,016 filed July 31, 1986 to David A. Howell et al for MANUAL REPLACEMENT OF OLD SPLIT-PIN ASSEMBLIES BY NEW SPLIT-PIN ASSEMBLIES, assigned to Westinghouse Electric Corporation (herein Howell) is incorporated herein by reference.

BACKGROUND OF THE INVENTION

This invention relates to nuclear reactors and it has particular relationship to the replacement of old split-pin assemblies (OSPA's), mounted in the flange of the lower guide tube (LGT), by new split-pin assemblies (NSPA's). Howell discloses apparatus for accomplishing his purpose. This apparatus includes a saw-and-drill stand and an installation stand. These stands are suspended submerged in about 20 feet of water from the walls of the pool of a nuclear reactor plant. The saw-and-drill stand serves to remove the OSPA's. The saw of the stand severs each old split-pin usually above the crotch where the tines join producing a split-pin fragment and another fragment. Then the other fragment is drilled usually upwardly and is broken into a fragment including the flange of the pin and another fragment including the nut and the fragment of the pin to which the nut is threaded. The three fragments are readily removed from the guide tubes and disposed of.

The Howell apparatus has performed highly satisfactorily. But it is desirable to further simplify the process of removing the OSPA's and it is an object of this invention to accomplish this purpose.

SUMMARY OF THE INVENTION

This invention arises from the realization that the OSPA can be separated into readily removable fragments by applying a torque sufficient to sever the nut from the pin in the region where the nut is metallurgically joined to the pin and then unthreading the nut from the pin. The nut is joined to the split-pin by a locking device including a button of generally T longitudinal cross section which engages the old split-pin in a keyway in the top of the split-pin. The button is welded to a cross pin or dowel pin which passes through the nut near the top. It has been realized that the separation may be effected at the locking device where there are several regions that can be severed by shearing stress resulting from the torque. The cross pin may be severed thus permitting separation of the old nut from the old split-pin. A weld usually has a higher resistance to stress than the parent metal. However in the locking device the cross-sectional area of the weld is smaller than the cross-sectional area of the pin. The separation may then be effected by shearing the weld. There is stress concentration under the torque in the top of the split-pin at the keyway. This region is further weakened by the thread in the split-pin which is engaged by the nut. The torque applied to the nut can shear the split pin in this region of the keyway permitting separation of the nut from the split-pin.

In accordance with this invention, the OSPA is separated into readily removable fragments by mounting the guide tube with the OSPA's in a stand similar or identical to the installation stand in Howell. This stand has cups or screw-driver like sockets each containing a knife edge or blade which is straddled by a pin of an OSPA whose guide tube is mounted on this stand. Torque is applied to the old nut by a long-handled wrench having a socket shaped to engage the nut in torque transmitting relationship. The knife edge straddled by the pin prevents the pin from turning when the torque is applied. By applying the torque, the cross-pin or the weld between the cross-pin and the button may be sheared or the split-pin itself may be sheared in the region of stress concentration. The nut is thus separated from the split-pin and may be unthreaded, then the split pin may be tapped out. Thereafter, while the guide tube is mounted in the installation stand, the new split-pin assembly is secured to the LGT. The saw-and-drill stand of the Howell apparatus is thus relegated to the status of a back-up tool.

This invention is uniquely applicable to the processing of OSPA's whose nuts have diametrically-cut slots in their walls. The wrench is provided with a socket shaped to engage such a nut in its slot and to apply the necessary torque. Because the slots are diametrically cut, their inner boundary axially is flat and the socket teeth have corresponding flat ends to engage this boundary. If the slots are cut axially, the teeth of the socket would have arcuate ends.

In practice it has been found that the maximum torque applied in shearing the locking devices is typically about 160 ft. lb. Computations of the torque required to sever the cross member of a typical button, composed of 304 AISI stainless steel of square transverse cross section 0.70 inch long and 0.25 inch wide on each side yields 255 ft. lb.

BRIEF DESCRIPTION OF THE DRAWINGS

For a better understanding of this invention, both as to its organization and as to its methods of operation, together with additional objects and advantages thereof, reference is made to the following description, taken in connection with the accompanying drawings, in which:

FIG. 3 is a plan view of the nut of the OSPA shown in FIGS. 2 and 2A;

FIG. 4 is a view in longitudinal section taken along line IV—IV of FIG. 3;

FIG. 5 is a fragmental view in side elevation taken in the direction V—V of FIG. 3;

DETAILED DESCRIPTION OF EMBODIMENT

Figure 1:
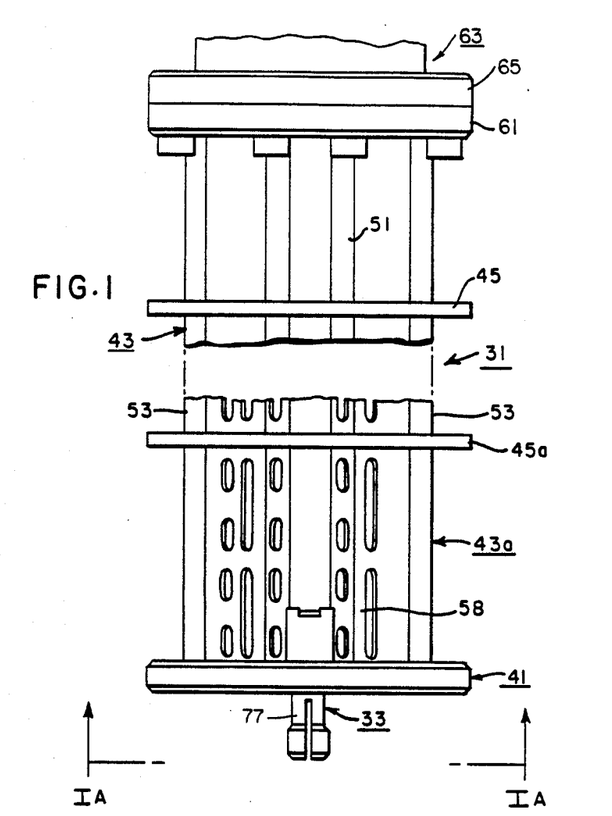
FIG. 1 is a view in side elevation of a guide tube in which OSPA's to be removed are mounted.
Figure 1A:
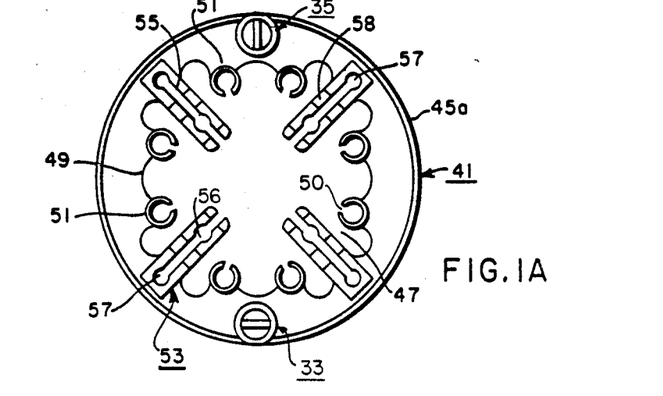
FIG. 1A is a bottom plan view taken in the direction IA—IA of FIG. 1.
Figure 2:
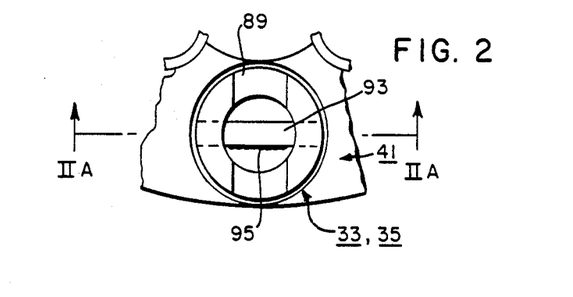
FIG. 2 is a fragmental plan view showing an OSPA to which this invention is uniquely applicable mounted in the flange of an LGT from which it is to be removed.
Figure 2A:
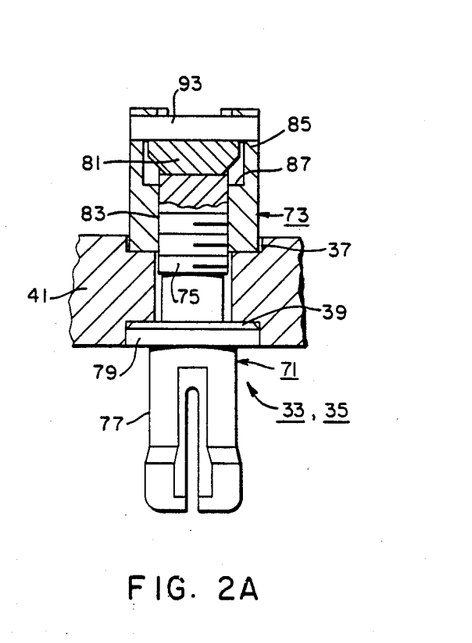
FIG. 2A is a fragmental view in side elevation and partly in longitudinal section taken in the direction IIA—IIA of FIG. 2.

FIGS. 1 and 1A show predominantly the lower section 31 of an LGT including old split-pin assemblies 33 and 35 which are to be replaced. The pins 33 and 35 are spaced diametrically in counterbores 37 and 39 (FIG. 2A) of the flange 41 of the section 31. The lower section 31 includes a plurality of sheaths 43 secured together by cards 45. The cards 45 have coextensive openings 47 (FIG. 1A), each opening having a boundary 49 whose envelope is of generally square shape. Each sheath 43 includes a plurality of tubes 51 of generally transverse C section whose openings are in communication with opening 47. The tubes 51 accommodate control-rod pins (not shown). The arms of the spider (not shown) from which the control rod pins radiate pass through openings or longitudinal slots 50 in the tubes 51. Control-rod guides 53 are mounted in the corners of the boundary 51. Each guide 53 has a transverse slot 55 in communication with opening 47. Each slot has longitudinal arcuate expansions 56 intermediate the ends and 57 near the outer ends for accommodating control rods (not shown). The tubes 51 and the guides 53 have longitudinal slots 58 for passing the coolant. The lowermost sheath 43a is connected between the lowermost card 45a and the flange 41. The uppermost sheath is connected between the uppermost card 45 and an upper flange 61 of section 31. The intervening sheaths are connected between cards 45. The upper section 63 of the guide tube has a flange (65) bolted to the flange 61.

The OSPA 33, 35 includes an old split-pin 71 and an old nut 73. The old split-pin 71 has a thread 75 near the top and a bifurcated end 77 at the bottom. Between the thread 75 and the end 77, the split-pin 71 has a flange 79. In the top of the old split-pin there is a keyway 80 (FIG. 6A) in which a button 81 (FIG. 6) is engaged.

The nut 73 is of generally annular shape and it has an internal thread 83 along the lower portion of its length (FIGS. 3–5). The upper portion 85 of the nut is of greater inside diameter than the lower portion so that the thread 83 extends from a shoulder 87. There are oppositely disposed slots 89 which extend from the top of the wall of the upper portion 85. In the sections of the wall of the upper portion which bound the slots 89 there are opposite holes 91 in which a cross pin 93 (FIGS. 2, 2A) is disposed. The cross pin 93 is joined by a weld 95 to the button 81 engaged in the keyway 80 in the split-pin 71. (See particularly FIG. 6). The cross pin 93, the button 81 and the weld 95 constitute a locking device for preventing the split pin from turning relative to the nut 73.

Figure 2B:
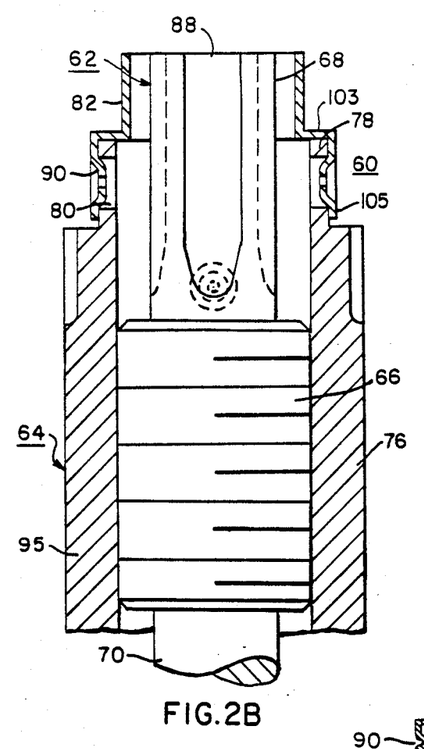
FIG. 2B is a view partly in section and partly in side elevation showing a new split-pin assembly before the cup extending from the new nut is crimped to the new split pin.
Figure 2C:
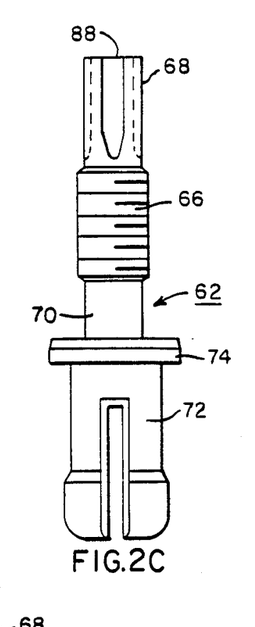
FIG. 2C is a view in side elevation of the new split pin of a new split-pin assembly.
Figure 2D:
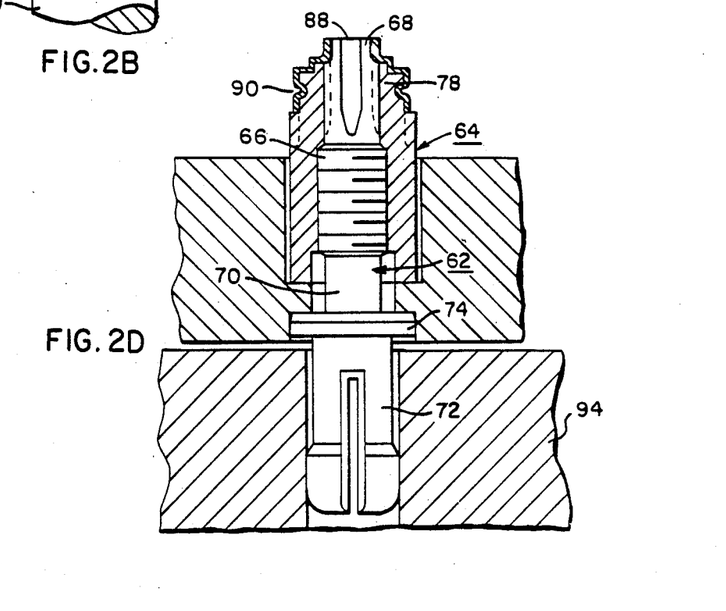
FIG. 2D is a view in longitudinal section of the NSPA as mounted in the guide tube and inserted in the upper core plate.

The NSPA 60 (FIG. 2B) in its state prior to crimping includes a new pin 62 (FIGS. 2B, 2C) and a new nut 64. The new pin 62 has near one end a thread 66 which is interposed between a stem 68 having elongated grooves or flutes 88 and a shank 70. The centers of the flutes 88 are spaced by 90° around the stem 68. The opposite end 72 of the new split-pin is bifurcated. A flange 74 is interposed between the end 72 and the shank 70. The new nut 64 includes a threaded section 76 from which a cylindrical head 78 extends. The head 78 has circular grooves or notches 80. Secured to the head 78 of the new nut 64 is a cup 82 (FIG. 2B) having a shoulder 84 from which a skirt 86 extends. The cup 82 is precrimped to the head by indentations 90 which engage the grooves 80 in the head. As shown in FIG. 2D in the completed NSPA 92, the cup 82 is crimped into the flutes 88 in the new pin 62. Also shown in FIG. 2D is a part of the upper core plate 94 of the reactor. The tines of the new split pin 62 extend into a hole in the core plate 94 gripping the wall of the hole.

Figure 6:
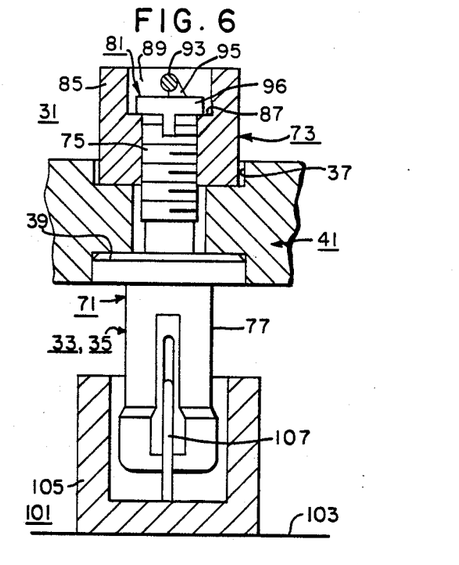
FIG. 6 is a fragmental view partly diagrammatic and partly in longitudinal section presented to aid in the understanding of this invention and showing an OSPA positioned to be severed for removal from a guide tube.

As shown in FIG. 6 the guide tube is mounted on a stand 101 similar to the installation stand of Howell. This stand is shown in detail in FIGS. 15 through 20. The stand 101 has a fixture 103 provided with cups or sockets 105. A knife edge or blade 107 extends centrally from the base of each socket. The guide tube is seated on the fixture 103 with the bifurcated ends 77 of each OSPA 33–35 extending into the sockets 105 and with the knife edge 107 between the tines. Circumferential torque of sufficient magnitude to shear the locking device is applied to the nut. The knife edge 107 prevents the split-pin 71 from turning under the torque exerted on the nut. The torque typically shears the keyway 80

Figure 6A:
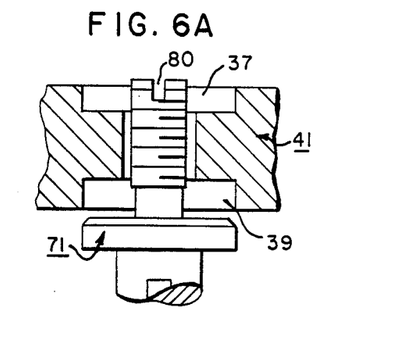
FIG. 6A is a fragmental view partly diagrammatic and partly in longitudinal section showing the manner in which the split-pin of an OSPA is removed from the flange of the LGT.
Figure 7:
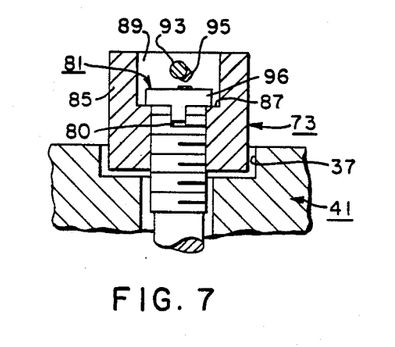
FIG. 7 is a fragmental view partly diagrammatic and partly in longitudinal section illustrating a severing operation in which the weld joining the cross pin of the locking device to the button of the OSPA is sheared.
Figure 7A:
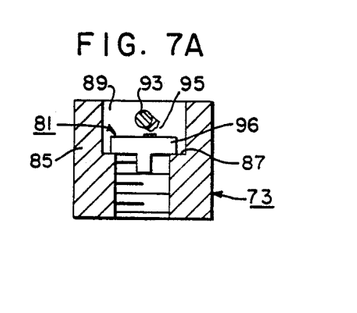
FIG. 7A is a fragmental view similar to FIG. 13 but showing the manner in which the nut of the OSPA is removed when the weld is sheared.
Figure 8:
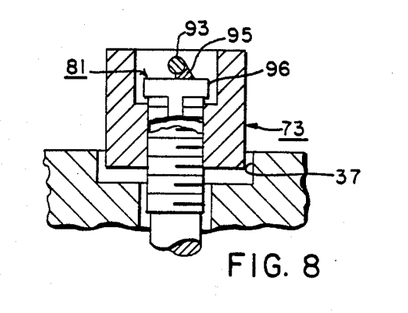
FIG. 8 is a fragmental view similar to FIG. 7 showing the severing operation in which the split-pin is sheared at the keyway in which the button is secured.
Figure 8A:
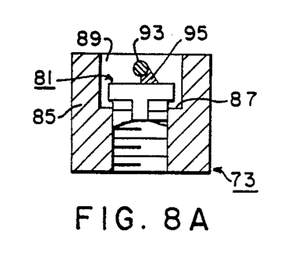
FIG. 8A is a fragmental view analogous to FIG. 7A but illustrating the manner in which the nut of the OSPA is removed on shearing of the keyway.
Figure 9:
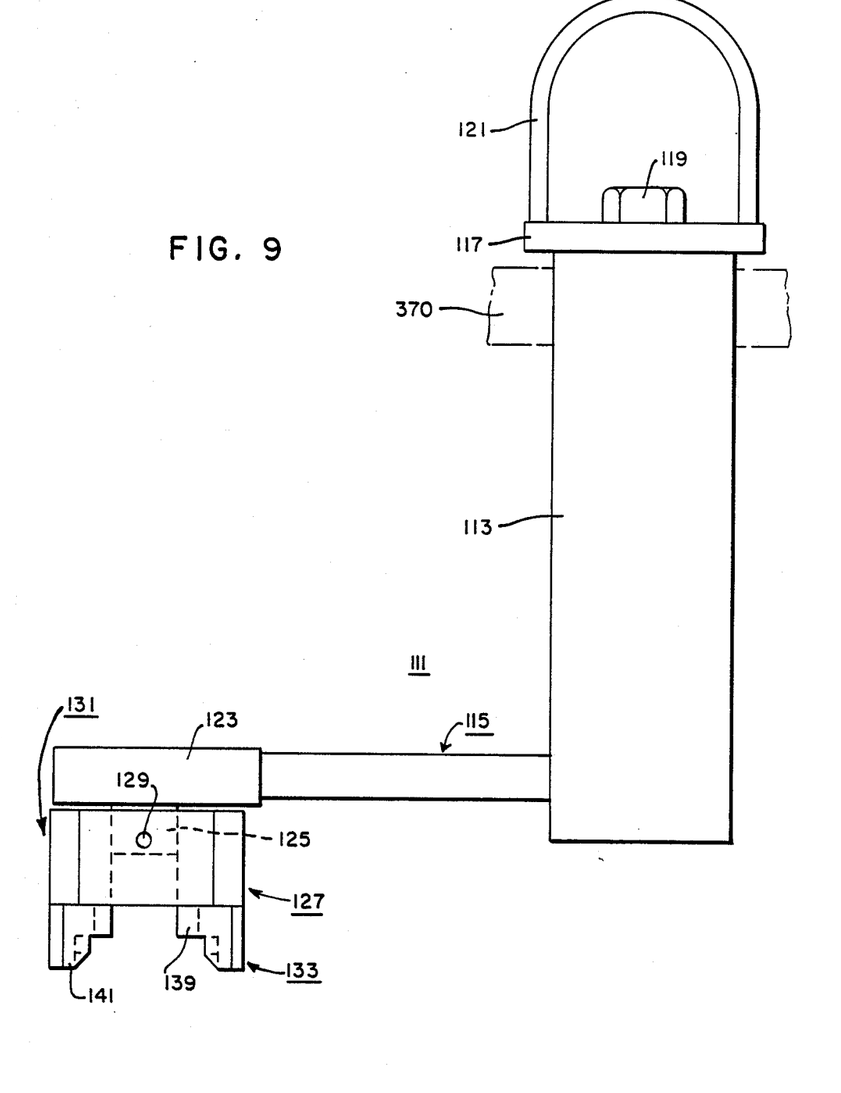
FIG. 9 is a view in side elevation showing the long-handled torque tool or wrench used in separating the OSPA shown in FIGS. 1 through 5 into a nut and pin fragment both readily removable from the flange of the LGT.
Figure 10:
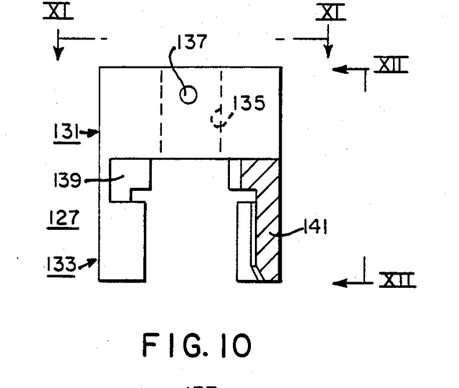
FIG. 10 is a view in side elevation and partly in longitudinal section of the socket of the wrench shown in FIG. 9.
Figure 11:
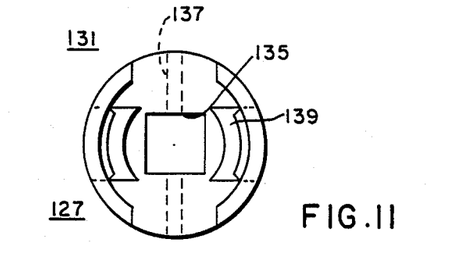
FIG. 11 is a plan view taken in the direction XI—XI of FIG. 10.
Figure 12:
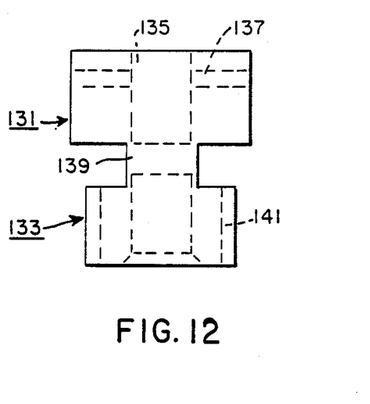
FIG. 12 is a view in side elevation taken in the direction XII—XII of FIG. 10.
Figure 13:
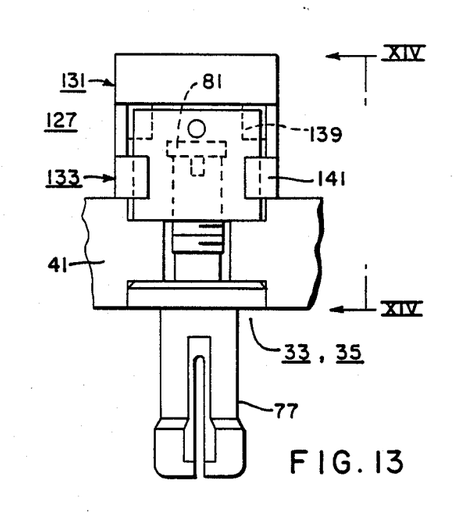
FIG. 13 is a fragmental, partly diagrammatic view in side elevation showing the manner in which the socket of the long-handled wrench engages the old nut of an OSPA.
Figure 14:
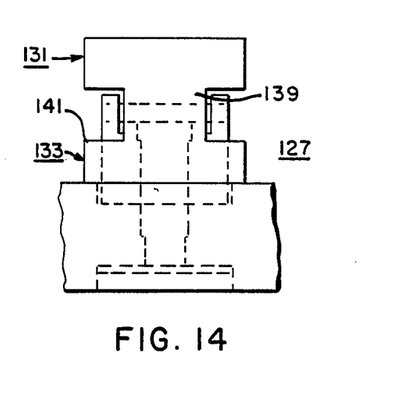
FIG. 14 is a fragmental view in side elevation taken in the direction XIV—XIV of FIG. 13.

(FIG. 6A) and may also shear the weld 95 (FIG. 8) between the button 81 and the pin 93. The torque may also shear the cross pin 93. Where the weld 95 is sheared, the nut 73 is unthreaded removing along with it the cross pin 93 the button 81 as shown in FIG. 7A. It is to be understood that in the locked state of the OSPA the cross member 96 of the button 81 overlaps the slot 89 in the nut 73 and engages the shoulder 87 (FIG. 7). Where the split-pin 71 is sheared at the keyway, the nut is unthreaded removing along with it, the cross pin 93, the button 81 and the fragments of the boundary of the keyway 80 adhering to the nut after the nut and the other parts are removed. The split-pin 71 may be tapped out. FIG. 6A shows the split-pin 71 less the button 81 in process of being separated.

The shearing torque is applied to the nut 73 by a long-handled offset torque tool or wrench 111. (Figs. 9–14). The tool 111 includes a long rod 113 from which an offset arm 115 extends. The rod 113 is of sufficient length to extend from a platform over the pool in which the guide tube 31 is processed to the OSPA's in the flange 41 of the guide tube 31. Typically the flange and the OSPA's are submerged under 20 ft. of water. A plate 117 is secured to the top of the bar 113 by a nut 119. A bail 121 spans the plate 117. The offset arm is integral with, or secured to, the rod 113 at its lower end. A head 123 containing internally a ratchet (not shown) extends from the outer end of the offset arm 115. A stud 125 of square transverse cross section extends centrally from the head 123. A socket 127 is secured to the stud 125 and is maintained positioned by pin 129. The assembly including the rod 113, the offset arm 115 including the head 123 may be procured from such manufacturers as Snap-On Tools Corporation, Kenosha Wis. 53141-2801.

The socket 127 (FIG. 10–14) includes an upper annular section 131 and a lower section 133. The upper section 131 has a hole 135 of square transverse cross section (FIG. 11) in which the stud 125 extending from the head 123 of the offset arm 115 is engaged. The upper section is provided with coaxial transverse holes 137 through which the pin 129 is passed. The lower section 133 is essentially a skirt structured to engage the nut 73 in the slots 89 (FIGS. 2–5). This section includes a pair of oppositely disposed, inwardly extending projections or teeth 139 dimensioned to engage the slots 89 in the nut and an annular portion 141 depending from the projections 139 and dimensioned to envelope the lower surface of the nut 73. This annular portion 141 forms a guide around the outer surface of the nut 73 which enables the rotation of the socket 127 so that it is oriented with the projections 139 in engagement with the nut 73 in the slots 89.

The installation stand 101 (FIGS. 15–20) includes a support 321 (FIG. 16) formed of a plurality of sets 323 of coextensive angles 325 joined at their ends by plates 327. The sets 323 are suspended from angle supports 329 which are themselves suspended from a block 331 connected to a plate 333 anchored to a bracket 335 on the corner 337 of the wall of the pool 338. The block 331 carries an eye bolt 339. Plates 327 and plates 341 at the lower ends of the angles 325 carry pads 343 which engage the adjacent wall 345 of the pool 338 and are preadjusted so that the support 321 is suspended vertically.

Figure 15:
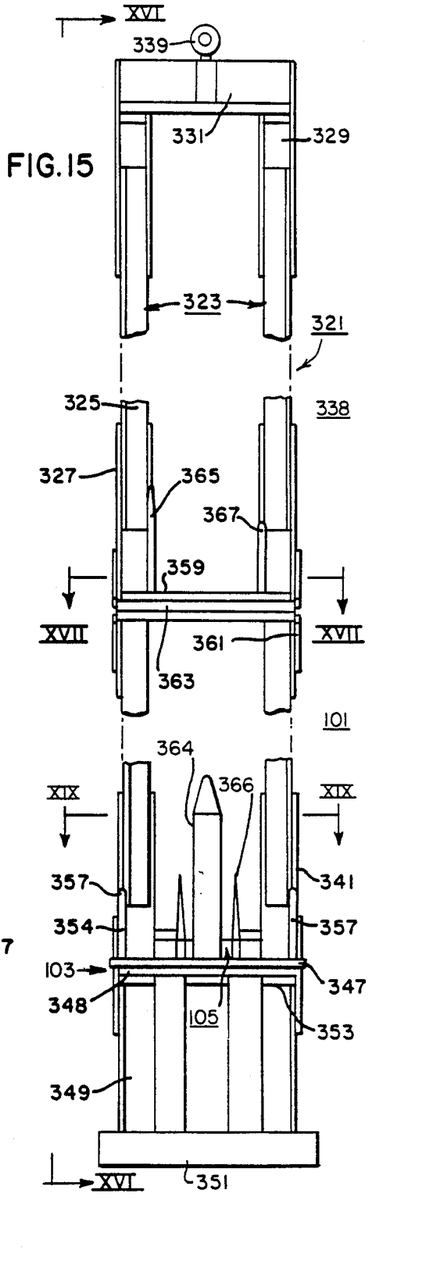
FIG. 15 is a view in side elevation of the stand in which a guide tube is mounted for processing in the practice of this invention.
Figure 16:
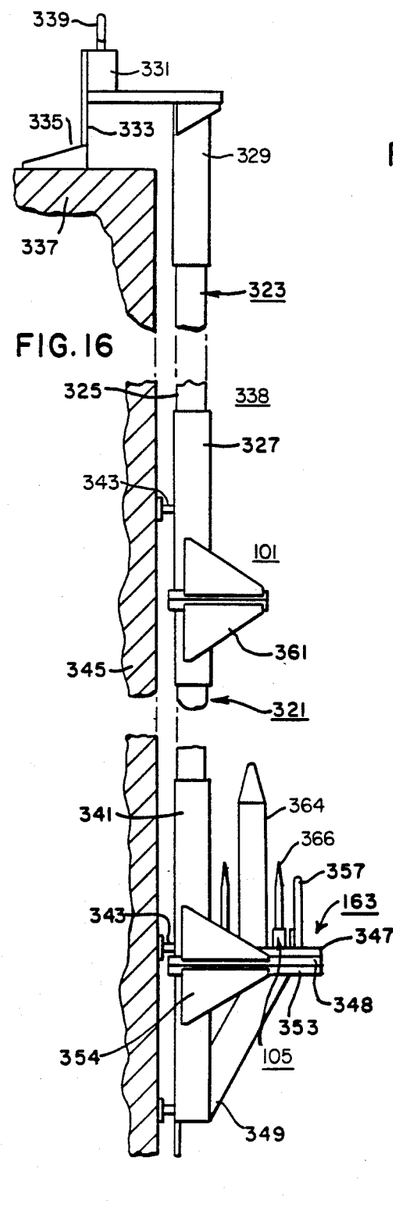
FIG. 16 is a view in end elevation taken in the direction XVI—XVI of FIG. 15.
Figure 17:
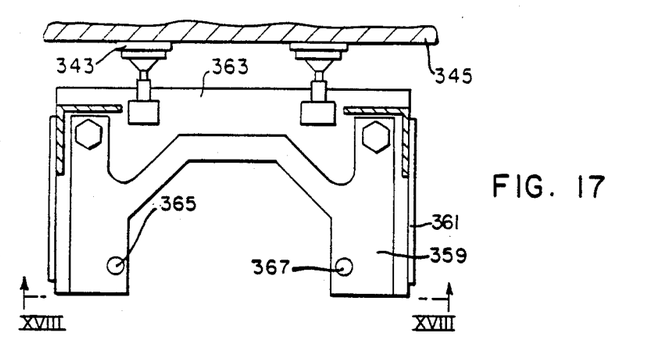
FIG. 17 is a view in section taken along line XVII—XVII of FIG. 15.
Figure 18:
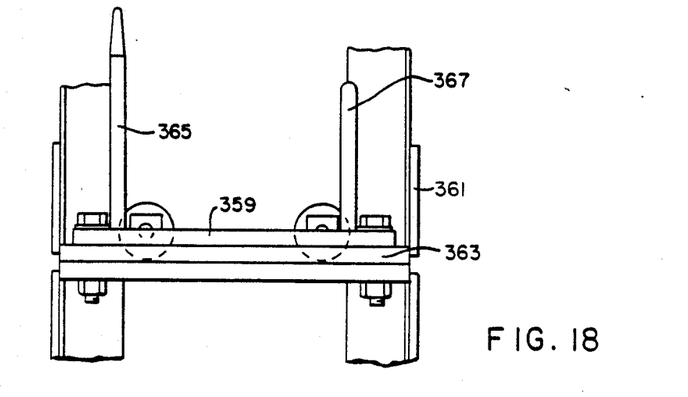
FIG. 18 is a fragmental view in end elevation taken in the direction XVIII—XVIII of FIG. 17.

The fixture 103 includes a baseplate 347 supported on a plate 348 of generally C section. The plates 347 and 348 are supported by braces 349 extending from a pedestal 351 (FIG. 15). The braces 349 have cross plates or ears 353 upon which the plates 347 and 348 are stacked. The plates 347 and 348 and the cross plates 353 are bolted together. The plates 347 and 348 are anchored to the plates 341 of the vertical supports by triangular brackets 354.

The sockets or cups 105 (FIGS. 19, 20) extend from the plate 347 and are spaced symmetrically with respect to the center of the plate along the line 356 of the plate parallel to the wall of pool 338. Each cup 105 includes an annular shell 358 (FIG. 20) within which the knife edge 107 is held in key slots 360. The slots 360 terminate slightly below the rim of the shell 358. The shell 358 is welded to plate 347. The bottom of the knife edge 107 is welded to the bottom of the keyway 360.

Figure 19:
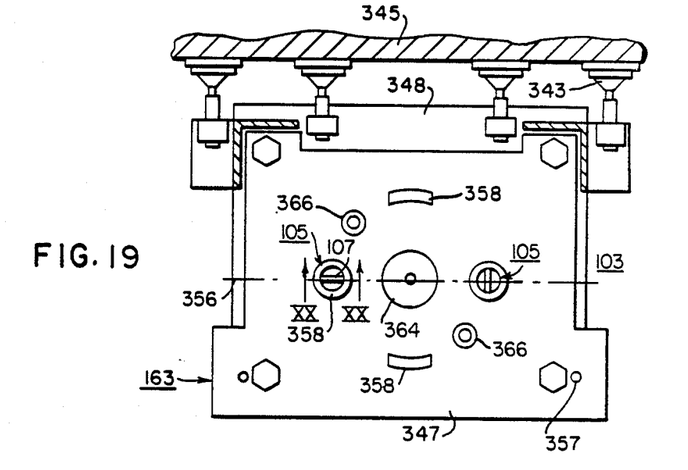
FIG. 19 is a view in section taken along line XIX—XIX of FIG. 15.
Figure 20:
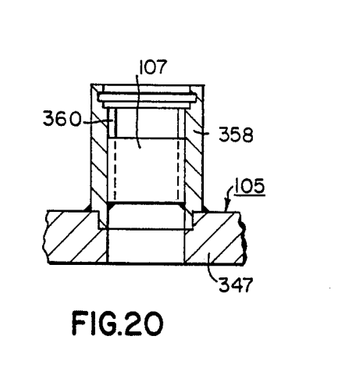
FIG. 20 is a view in section taken along line XX—XX of FIG. 19.

A pin 364 extends from the center of plate 347 and pins 366 extend from the plate 347 spaced symmetrically with respect to the center along a line at 45° to the center line 356. The pins 364 and 366 serve to position the guide tube (31–63) appropriately on the fixture 103. The pin 364 extends through the center of the section 31 (FIG. 1A) of the guide tube. The pins 366 extend through oppositely diagonally disposed expansions 57 (FIG. 1A). Projections or pads 358 extend from the surface of plate 347 (FIG. 19). The guide tube is positioned on these pads, and they take up its weight. When a guide tube is positioned on plate 347 with the pins 364 and 366 penetrating through the center and through the openings 57, its counterbores 37 (FIGS. 2, 6, 7, 8) extend over the knife edges or blades 107 so that the old split pins may straddle the blades 107. The plate 347 is widened near the outer end and pins 357 extend from the ears resulting from the expanded width. These pins serve for positioning the mechanism of the crimping assembly (not shown) for crimping the cups (not shown) onto the flutes (not shown) of the new split pins (not shown) as disclosed in Howell. The stand 101 thus serves both for removing the OSPA's and for installing the NSPA's.

A guide plate 359 of generally C-section is suspended from the support 321 by brackets 361 of triangular shape connected to joining plate 327. The guide plate 359 is mounted on baseplates 363. The plates 359 and 363 are dowelled and bolted together. The inner edge of the guide plate 359 is shaped to accommodate the guide tube (31, 63). The guide plate 359 carries pins 365 and 367. These pins, pass through holes in the flange (not shown) joining the upper guide tube (not shown) and the LGT (31–63).

In the practice of this invention the guide tube 31–63 is mounted on the stand 101 with the old split-pins straddling the blade 107. The wrench 111 is then positioned with the socket 127 enveloping the nut 73 of each OSPA 33–35 in its turn. The rod 113 of the wrench may be passed through a hole in a block 370 on the platform (not shown) above the pool 338 so that it is maintained vertical. By operating the ratchet on the head 123 of the offset arm 115, the socket 127 is rotated guided by the portion 141 of the socket to engage the projections 139 in the slots 89 of the nut. Torque is then applied to the nut to shear the weld 95, or the pin 71 at the keyway 80 or the cross-pin 93. By operation of the ratchet (not shown) the nut 73 is unthreaded from the split pin 71 carrying with it any fragments of the split pin attached to it. What is left of the split pin is then tapped out.

After both OSPA's 33, 35 are removed from LGT 31, the LGT is temporarily removed from the installation stand 101. With a long-handled tool such as is shown in FIG. 25 of Nee application No. 617,854 filed June 6, 1984 (identified in Howell), the split-pins 62 of the NSPA's are then mounted with their tines straddling the knife edges 107 in the cups or sockets 105 (FIG. 19) of stand 101. The LGT 31 is then repositioned on the stand 101 with the base of the counterbore 39 (FIG. 2A) seated on the flange 74 and the upper part of the thread 66 and the stem 68 extending above flange 41. The new nut 64 is now threaded onto the new split-pin 62 with a long-handled runner such as is shown (at 171) in FIGS. 21 and 22 of Howell and is tightened with a wrench such as is shown (at 173) in FIG. 23 of Howell. The pins 62 are thus secured in the counterbores 37 and 39 of the LGT 31. Next, the cup 82 is crimped in the flutes 88 of the new split-pin 62 with a long handled crimper such as is shown in FIGS. 24A and 24B of Howell. The structure shown in FIG. 2D is thus produced. Only one stand 101 is used to achieve this purpose.

While an embodiment of the invention has been disclosed herein, many modifications thereof are feasible. This invention is not to be restricted except insofar as is necessitated by the spirit of the prior art.

We claim:

1. In the replacement of an old split-pin assembly of a guide tube of a nuclear reactor by a new split-pin assembly, said old split-pin assembly including an old nut and an old split-pin, said old nut being threaded on said old split-pin and secured to said old split-pin by a locking device including a metallurgical joint between said nut and split-pin, the method of removing said old split-pin assembly from said guide tube, the said method being practiced with a wrench including a socket having means to engage said nut, and with means for mounting said guide tube with said old split-pin assembly positioned to be processed for removal from said guide tube, said mounting means including means, to be connected to said old split pin, for preventing rotation of said old pin on the application of a rotation torque to said old nut; the said method comprising mounting said guide tube on said mounting means with said old split-pin connected to said pin-rotation-preventing means, engaging said socket of said wrench with said old nut, next applying sufficient torque to said old nut through said wrench to shear said locking device, then unthreading said old nut from said old split-pin, and separately removing said old nut and said old split-pin.

2. In the replacement of an old split-pin assembly of a guide tube of a nuclear reactor by a new split-pin assembly, said old split-pin assembly including an old nut and an old split-pin, said old nut being threaded on said old split-pin and secured to said old split-pin by a locking device including a metallurgical joint between said nut and split-pin, the method of removing said old split-pin assembly from said guide tube, the said method being practiced with a wrench including a socket having means to engage said nut, and with means for mounting said guide tube with said old split-pin assembly positioned to be processed for removal from said guide tube, said mounting means including means, to be connected to said old split pin, for preventing rotation of said old pin on the application of a rotation torque to said old nut; the said method comprising mounting said guide tube on said mounting means with said old split-pin connected to said pin-rotation-preventing means, engaging said socket of said wrench with said old nut, next applying sufficient torque to said old nut through said wrench to shear said old split-pin, then unthreading said old nut and the fragment of said old split-pin joined thereto from the remaining fragment of said old split-pin and separately removing said old nut and said fragment joined thereto and the remaining fragment of said old split pin from said guide tube.

3. In the replacement of an old split-pin assembly of a guide tube of a nuclear reactor by a new split-pin assembly wherein the old split-pin assembly includes an old nut having slots in its wall and an old split-pin, the nut being threaded on said old split-pin and being secured to said split-pin by a locking device including a metallurgical joint between said nut and pin;

the method of removing said old split assembly from said guide tube, the said method being practiced with a wrench having a socket shaped to engage said old nut in said slots and with means for mounting said guide tube with said old split-pin assembly positioned to be processed for removal from said guide tube, the said mounting means have means to be connected to said old split-pin, for preventing rotation of said old, split-pin on application of a rotation torque to said old nut;

the said method comprising mounting said guide tube on said mounting means with said old split-pin connected to said pin-rotation-preventing means, next engaging said socket in said slots of said old nut and manipulating said wrench so as to exert a high torque on said old nut to shear said locking device, after said locking device is sheared unthreading said nut from said split-pin and removing said nut and split-pin separately from said guide tube.

4. In the replacement of an old split-pin assembly of a guide tube of a nuclear reactor by a new split-pin assembly wherein the old split-pin assembly includes an old nut having slots in its wall and an old split-pin, the nut being threaded on said split-pin and being secured to said split-pin by a locking device including a metallurgical joint between said nut and pin;

the method of removing said old split assembly from said guide tube, the said method being practiced with a wrench having a socket shaped to engage said old nut in said slots and with means for mounting said guide tube with said old split-pin assembly positioned to be processed for removal from said guide tube, the said mounting means have means to be connected to said old split-pin, for preventing rotation of said old, split-pin on application of a rotation torque to said old nut;

the said method comprising mounting said guide tube on said mounting means with said old split-pin connected to said pin-rotation-preventing means, next engaging said socket in said slots of said old nut and manipulating said wrench so as to exert a high torque on said nut to shear said old split-pin, then unthreading said old nut and the fragment of said old split-pin joined thereto from the remaining fragment of said old split-pin and separately removing said old split-pin and said fragment joined thereto and said remaining fragment of said old split-pin from said guide tube.

5. For use in the removal of an old split-pin assembly from the guide tube of a nuclear reactor in the replacement of said old split-pin assembly by a new split-pin assembly, said old split-pin assembly having an old split-pin, an old nut and a locking device including a metallurgical joint between said pin and nut;

apparatus including a stand, means for mounting a guide tube having an old split-pin assembly on said stand, said mounting means including means, to engage said old split-pin of said assembly for preventing rotation of said old split-pin on application of a circumferential torque to said old nut, and a wrench having a socket, said socket having means to engage said old nut permitting the application of a high circumferential torque to said old nut sufficient to shear said locking device and/or to shear said old split-pin.

6. For use in the removal of an old split-pin assembly from the guide tube of a nuclear reactor in the replacement of said old split-pin assembly by a new split-pin assembly, said old split-pin assembly having an old split-pin, an old nut threaded on said pin and a locking device including a metallurgical joint between said nut and split-pin, the said old nut having slots along its wall; apparatus including a stand, means for mounting a guide tube having an old split-pin assembly on said stand, said mounting means including means, to engage said old split-pin of said assembly for preventing rotation of said old split-pin on application of a circumferential torque to said old nut, and a wrench having a socket, said socket having means to engage said old nut in said slots permitting the application of a high circumferential torque to said old nut sufficient to shear said locking device and/or to shear said old split-pin.

7. The method of removing an old split-pin assembly mounted in the guide tube of a nuclear reactor in the replacement of said old split-pin assembly by a new split-pin assembly, said old split-pin assembly including an old nut, an old split-pin and locking means for locking said old nut to said old split pin; the said method comprising: mounting said guide tube on a stand with said old split-pin engaging means for preventing its rotation on application of a circumferential torque to said old nut, next engaging said old nut with a wrench, next applying circumferential torque to said old nut with said wrench to shear said locking means and/or said old split pin, next removing said old nut and any fragments attached to it from said old split pin, and finally disposing of said old nut and fragments and said old split pin.

8. In the replacement of an old split-pin assembly of a guide tube of a nuclear reactor by a new split-pin assembly, said old split-pin assembly including an old nut and old split-pin, said old nut being threaded on said old split-pin and secured to said old split-pin by a locking device including a metallurgical joint between said nut and split-pin, the method of removing said old split-pin assembly from said guide tube and replacing said old split-pin assembly by a new split-pin assembly, said method being practiced with a wrench including a socket having means to engage said nut, and with means for mounting said guide tube with said old split-pin assembly positioned to be processed for removal from said guide tube, said mounting means including means, to be connected to said old split-pin, for preventing rotation of said old pin on the application of a rotation torque to said old nut; said method comprising mounting said guide tube on said mounting means with said old split-pin connected to said pin-rotation-preventing means, engaging said socket of said wrench with said old nut, next applying sufficient torque to said old nut through said wrench to shear said locking device, then unthreading said old nut from said old split-pin, and separately removing said old nut and said old split-pin, next temporarily removing said guide tube from said mounting means, then positioning a new split-pin in said mounting means with said new split-pin connected to said rotation-preventing means, and thereafter repositioning said guide tube on said mounting means with said new split-pin accessible for threading a new nut, next threading a new nut on said new split-pin and securing said new nut and new split-pin to said guide tube and said new nut to said new split-pin to form a new split-pin assembly secured to said guide tube.

9. The method of claim 2 including the replacement of the old split-pin assembly by a new split-pin assembly, by carrying out the following additional steps after the old split-pin assembly has been removed from the guide tube:
temporarily removing the guide tube from the mounting means, then positioning a new split-pin in said mounting means with said new split-pin connected to the rotation-preventing means, and thereafter repositioning said guide tube on said mounting means with said new split-pin accessible for threading a new nut, then threading a new nut on said new split-pin and securing said new nut and new split-pin to said guide tube and said new nut to said new split-pin to form a new split-pin assembly secured to said guide tube.

10. The method of claim 3 including the replacement of the old split-pin assembly by a new split-pin assembly, by carrying out the following additional steps after the old split-pin assembly has been removed from the guide tube:
temporarily removing the guide tube from the mounting means, then positioning a new split-pin in said mounting means with said new split-pin connected to the rotation-preventing means, and thereafter repositioning said guide tube on said mounting means with said new split-pin accessible for threading a new nut, then threading a new nut on said new split-pin and securing said new nut and new split-pin to said guide tube and said new nut to said new split-pin to form a new split-pin assembly secured to said guide tube.

11. The method of claim 4 including the replacement of the old split-pin assembly by a new split-pin assembly by carrying out the following additional steps after the old split-pin assembly has been removed from the guide tube:
temporarily removing the guide tube from the mounting means, then positioning a new split-pin in said mounting means with said new split-pin connected to the rotation-preventing means, and thereafter repositioning said guide tube on said mounting means with said new split-pin accessible for threading a new nut, then threading a new nut on said new split-pin and securing said new nut and new split-pin to said guide tube and said new nut to said new split-pin to form a new split-pin assembly secured to said guide tube.

12. The method of removing an old split-pin assembly mounted in the guide tube of a nuclear reactor and replacing said old split-pin assembly by a new split-pin assembly, said old split-pin assembly including an old nut, and old split-pin and locking means for locking said old nut to said old split-pin; the said method comprising: mounting said guide tube on a stand with said old split-pin engaging means for preventing its rotation on application of a circumferential torque to said old nut, next engaging said old nut with a wrench, next applying circumferential torque to said old nut with said wrench to shear said locking means and/or said old split pin, next removing said old nut and any fragments attached to it from said old split-pin, disposing of said old nut and fragments and said old split-pin, thereafter temporarily removing said guide tube from said stand, then positioning a new split-pin in said stand with said new split-pin engaging said rotation-preventing means, then repositioning said guide tube on said stand with said new split-pin accessible for threading a new nut, then threading a new nut onto said new split-pin to secure said new split-pin to said guide tube, and securing said new nut to said new split-pin to form a new split-pin assembly secured to said guide tube.

* * * * *